(12) United States Patent
Nguyen et al.

(10) Patent No.: US 9,800,585 B2
(45) Date of Patent: Oct. 24, 2017

(54) RESTRICTING ACCESS BY SERVICES DEPLOYED ON AN APPLICATION SERVER

(71) Applicant: Red Hat, Inc., Raleigh, NC (US)

(72) Inventors: Filip Nguyen, Brno (CZ); Filip Elias, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 71 days.

(21) Appl. No.: 14/919,126

(22) Filed: Oct. 21, 2015

(65) Prior Publication Data

US 2017/0118219 A1    Apr. 27, 2017

(51) Int. Cl.
*H04L 29/06* (2006.01)
*H04L 29/08* (2006.01)

(52) U.S. Cl.
CPC ............ *H04L 63/102* (2013.01); *H04L 63/10* (2013.01); *H04L 67/303* (2013.01)

(58) Field of Classification Search
None
See application file for complete search history.

(56) References Cited

U.S. PATENT DOCUMENTS

| | | |
|---|---|---|
| 7,454,786 B2 | 11/2008 | Chang et al. |
| 7,475,388 B2 | 1/2009 | Fong et al. |
| 8,843,894 B2 | 9/2014 | Dawson et al. |
| 8,856,734 B2 | 10/2014 | Thyagarajan et al. |
| 8,881,145 B2 | 11/2014 | Chiueh et al. |
| 9,116,707 B2 | 8/2015 | Reinhold et al. |
| 2012/0143938 A1* | 6/2012 | du Preez ............... G06F 8/65 709/201 |
| 2013/0263270 A1* | 10/2013 | Cote .................. G06F 21/52 726/24 |
| 2017/0003938 A1* | 1/2017 | Gulkis ................ G06F 8/315 |

FOREIGN PATENT DOCUMENTS

EP    0969361    1/2000

OTHER PUBLICATIONS

"Plug-In Dependencies;" pp. 1-3, http://help.eclipse.org/mars/index.jsp?topic=%2Forg.eclipse.pde.doc.user%2Fguide%2Ftools%2Feditors%2Fmanifest_editor%2Fdependencies.htm.

(Continued)

*Primary Examiner* — Michael R Vaughan
(74) *Attorney, Agent, or Firm* — Haynes and Boone, LLP (57) ABSTRACT

An example method for controlling access to services coupled to an application server includes receiving a set of method calls issued from originator services to target services and recording information about the set of method calls into a data structure. The method also includes modifying, based on user input, the data structure to exclude each unauthorized method call from the data structure. The method further includes receiving a first method call from a first originator service to a target service, and determining, based on searching the data structure, whether the first originator service is authorized to issue the first method call to the first target service. In response to a determination that the first originator service is not authorized to issue the first method call to the first target service, the application server may block the first originator service from issuing the first method call to the first target service.

20 Claims, 6 Drawing Sheets

(56) References Cited

OTHER PUBLICATIONS

"JBOSS Application Server; Installation and Getting Started Guide;" JBoss Community; pp. 1-64; http://docs.jboss.org/jbossas/docs/Installation_And_Getting_Started_Guide/5/html_single/.
"Detecting Vulnerable Java Dependencies at Build Time;" pp. 1-3; https://securityblog.redhat.com/2013/01/02/detecting-vulnerable-java-dependencies-at-build-time/.
"An Opinionated Guide to Modern Java, Part 2: Deployment, Monitoring & Management, Profiling and Benchmarking;" pp. 1-37; By Ron; http://blog.paralleluniverse.co/2014/05/08/modern-java-pt2/.

* cited by examiner

RESTRICTING ACCESS BY SERVICES DEPLOYED ON AN APPLICATION SERVER

BACKGROUND

The present disclosure generally relates to security in application servers, and more particularly to controlling access by a service deployed on an application server to a target service.

An application server is software that provides services to applications or other services deployed on the application server. Applications deployed on an application server may have different needs or dependencies and may use the dependencies in different ways. In the JAVA programming language, it may be difficult to create restrictions on how certain applications deployed on an application server behave. For example, a JAVA application starts with privileges of the user who started it, and the JAVA application can exploit these privileges. Clearly defined dependencies may provide better control over how applications behave. For example, the module mechanism in JBOSS Application Server can achieve this. One of the original reasons for a module system is to allow different versions of a dependency to be used simultaneously by different applications deployed on the application server. The administrator may use this module mechanism to restrict an application or service from using particular services. Even with this module mechanism, however, problems still exist.

A service may have legitimate access (has dependencies) to libraries that access a relational database because, for example, the service stores its messages into the relational database. Typically, when an application is deployed on an application server, the application may access any service (e.g., database) that is coupled to or deployed on the application server. Unfortunately, a security problem may exist because the service may exploit this database library dependency and access any database coupled to the application server, potentially causing damage. The access may be a malicious access or a scenario in which an administrator of the application server mistakenly accesses a different database than intended.

BRIEF SUMMARY

This disclosure relates to restricting access by services deployed on an application server to other services deployed on or coupled to the application server. Methods, systems, and techniques for controlling access to one or more services coupled to an application server are provided.

According to an embodiment, a method of controlling access to one or more services coupled to an application server includes receiving a set of method calls issued from one or more originator services deployed on an application server to one or more target services. The method also includes for each method call of the set of method calls, recording a method name, zero or more parameters, an originator service, and a target service of the respective method call into a data structure. The method further includes receiving user input indicating whether method calls recorded in the data structure are authorized. The method also includes modifying, based on the user input, the data structure to exclude each unauthorized method call recorded in the data structure. The method further includes receiving a first method call specifying a first method name, a set of zero or more parameters, and a first target service. The first method call is issued from a first originator service deployed on the application server to the first target service. The method also includes after modifying the data structure, searching the data structure to determine whether the first originator service is authorized to issue the first method call to the first target service. The method further includes in response to a determination that the first originator service is not authorized to issue the first method call to the first target service, blocking the first originator service from issuing the first method call to the first target service.

According to an embodiment, a system for controlling access to one or more services coupled to an application server includes a data structure that stores information on calls of methods issued by one or more originator services deployed on an application server to one or more target services coupled to the application server. The system also includes a monitor that receives a set of method calls from the one or more originator services, and that records a method name, zero or more parameters, an originator service, and a target service of each method call of the set of method calls into the data structure. The system further includes a verification module that receives user input indicating whether method calls recorded in the data structure are authorized and that modifies, based on the user input, the data structure to exclude each unauthorized method call recorded in the data structure. The system also includes a security module that receives a first method call after the verification module has modified the data structure and searches the data structure to determine whether an originator service of the first method call is authorized to issue the first method call to a first target service of the first method call. In response to a determination that the first originator service is not authorized to issue the first method call to the first target service, the security module blocks the first originator service from issuing the first method call to the first target service.

According to another embodiment, a non-transitory machine-readable medium includes a plurality of machine-readable instructions that when executed by one or more processors are adapted to cause the one or more processors to perform a method including: receiving a set of method calls issued from one or more originator services deployed on an application server to one or more target services; for each method call of the set of method calls, recording a method name, zero or more parameters, an originator service, and a target service of the respective method call into a data structure; receiving user input indicating whether method calls recorded in the data structure are authorized; modifying, based on the user input, the data structure to exclude each unauthorized method call recorded in the data structure; receiving a first method call specifying a first method name, a set of zero or more parameters, and a first target service, where the first method call is issued from a first originator service deployed on the application server to the first target service; after modifying the data structure, searching the data structure to determine whether the first originator service is authorized to issue the first method call to the first target service; and in response to a determination that the first originator service is not authorized to issue the first method call to the first target service, blocking the first originator service from issuing the first method call to the first target service.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architecture
  A. Dependency Runtime Mapping Phase
  B. Correction Phase
  C. Access Restriction Phase
III. Example Method
IV. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A service deployed on an application server may issue methods calls to a target service coupled to the application server, even if the originator service is not authorized to do so. An originator service refers to the originator of the method call and may be thought of as a "client" requesting the services of a target service. A target service refers to the target of the method call and provides methods that may be invoked by originator services. The target service may be, for example, a service that is deployed on or coupled to the application server. It should be understood that an originator service may also be a target service that provides methods that are invoked by other services. A service coupled to an application server may be vulnerable to intentional or unintentional accesses by services deployed on the application server. It may be desirable to prevent such unauthorized accesses by originator services.

II. Example System Architecture

Figure 1:
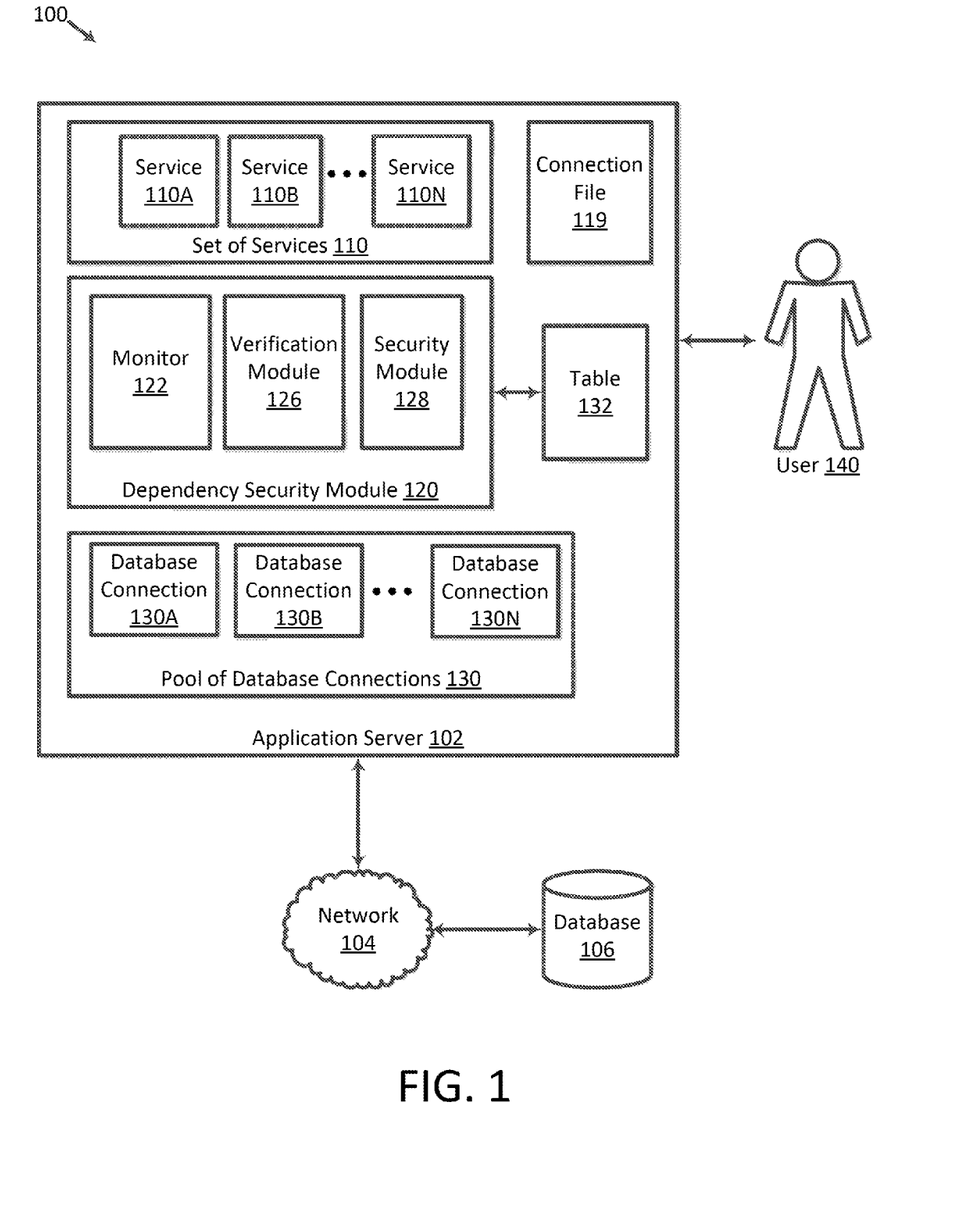
FIG. 1 is a block diagram illustrating a system for controlling access by one or more services deployed on an application server in accordance with one or more embodiments.

FIG. 1 is a block diagram 100 illustrating a system for controlling access by one or more services deployed on an application server in accordance with one or more embodiments. Diagram 100 includes an application server 102 coupled over a network 104 to a database 106, which may be any data source that is capable of storing information that is retrievable or modifiable by a service deployed on application server 102. In some examples, database 106 is a relational database.

Network 104 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Application server 102 includes a set of services 110, connection file 119, dependency security module 120, and pool of database connections 130. Set of services 110 may be deployed on application server 102 and includes a service 110A, service 110B, . . . , and service 110N. A service may include one or more modules and may refer to a software component that is able to accomplish a task. In an example, a service may be an enterprise service or enterprise application that accomplishes a task. A service deployed application server 102 may request the services of another entity (e.g., another service deployed on application server 102 (e.g., service 110B) or a service that is coupled to application server 102 (e.g., database 106)) by issuing a method call to the other entity.

An originator service refers to the originator of the method call and may be thought of as a "client" requesting the services of the other entity via the issued method call. The method call is issued to a target service, which refers to the target of the method call. The target service provides one or more methods that may be invoked by one or more originator services. A method call invokes a method provided by a target service and includes a set of zero or more parameters. A method may have zero or more parameters, and a parameter may be an input and/or output parameter. A method call may specify the name of a method to be invoked at a target service, a set of zero or more parameters of the method call, and the target service that provides the method to be invoked. If the target service receives a method call from an originator service, the target service may invoke the method call with the parameters (if any) and provide originator service with a result of the method call, if there are any result(s) to be returned to the originator service.

Connection file 119 defines connections to external data sources (e.g., database 106) that are coupled to application server 102. In some examples, application server 102 is a JAVA application server, and the data sources listed in connection file 119 may be accessed by all applications and services deployed on application server 102 via an internal JAVA Naming and Directory Interface (JNDI). Application server 102 maintains pool of database connections 130 for accessing one or more target services deployed on or coupled to application server 102. In some examples, for an originator service to access a target service, dependency security module 120 provides the originator service with a database connection from pool of database connections 130 to use to communicate with the target service. In some examples, the database connection is a Java object that is used by the originator service to communicate with the target service.

Dependency security module 120 includes a monitor 122, verification module 126, and security module 128. Dependency security module 120 may implement the security features for restricting access by an originator service deployed on application server 102 to a target service deployed on or coupled to application server 102 in three phases. As discussed further below, the first phase may be the dependency runtime mapping phase, the second phase may be the correction phase, and the third phase may be the access restriction phase. Although three phases are described below, it should be understood that dependency security module 120 may use one or more phases to implement the security features for restricting access by originator services. Dependency security module 120 may be deployed on application server 102. In some examples, dependency security module 120 is a plug-in that helps a user 140 (e.g., an administrator of application server 102) to better control the security of services deployed on application server 102. In some examples, dependency security module 120 is native to application server 102.

Figure 2:
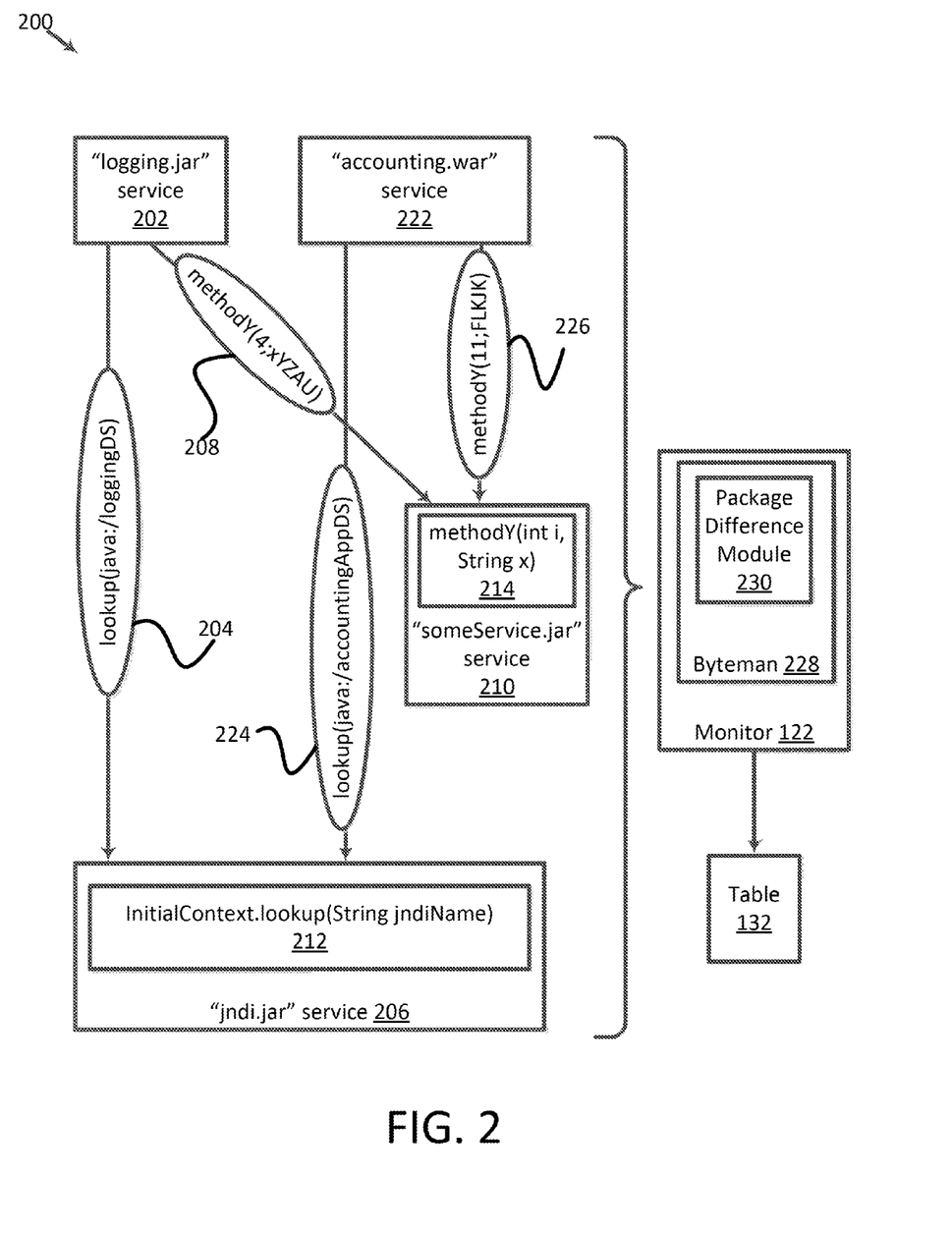
FIG. 2 is a block diagram illustrating one or more originator services issuing a set of method calls to one or more target services in accordance with one or more embodiments.

Monitor 122 monitors and receives a set of method calls issued from one or more originator services deployed on application server 102 to one or more target services. A target service may be deployed on or coupled to application server 102. FIG. 2 is a block diagram 200 illustrating one or more originator services issuing a set of method calls to one or more target services in accordance with one or more embodiments. In FIG. 2, a "logging.jar" service 202 is an originator service deployed on application server 102 that issues a method call 204 to a "jndi.jar" service 206 and a method call 208 to "someService.jar" service 210. In this example, "jndi.jar" service 206 is a target service including a method 212 named "lookup" having one string parameter, and method call 204 specifies the "lookup" method, a string parameter value "loggingDS," and "jndi.jar" service 206 as the target service. Additionally, the "someService.jar" service 210 is a target service including a method 214 named "methodY" having a first parameter of an integer type and a second parameter of a string type, and method call 208 specifies the "methodY" method, a first integer parameter value "4," a second string parameter value "xYZAU," and "someService.jar" service 210 as the target service.

Similarly, an "accounting.war" service 222 is an originator service deployed on application server 102 that issues a method call 224 to "jndi.jar" service 206 and method call 226 to "someService.jar" service 210. The "accounting.war" service 222 may be a web application that accesses financial information for a company and that uses several different target services. The "jndi.jar" service 206 may be a service that provides database connections from pool of database connections 130 to originator services so that they can access target services. In an example, "someService.jar" service 210 corresponds to database 106 in FIG. 1, and "jndi.jar" service 206 provides "accounting.war" service 222 with a database connection from pool of database connections 130 to access and modify data stored in database 106. The database connection may be a JAVA object. In order for "accounting.war" service 222 to access database 106, "accounting.war" service 222 looks up the database connection by requesting the services of "jndi.jar" service 206, and will get this database connection from "jndi.jar" service 206. In this example, method call 224 specifies the "lookup" method, a string parameter value "accountingAppDS," which may be the name of the database connection, and "jndi.jar" service 206 as the target service.

Additionally, method call 226 specifies the "methodY" method, a first integer parameter value "11," a second string parameter value "FLKJK," and "someService.jar" service 210 as the target service. Although "jndi.jar" service 206 and "someService.jar" service 210 are illustrated as being target services in FIG. 2, it should be understood that "jndi.jar" service 206 and/or "someService.jar" service 210 may issue a method call to another entity and therefore become an originator service. Likewise, although "logging.jar" service 202 and "accounting.war" service 222 are illustrated as being originator services in FIG. 2, it should be understood that "logging.jar" service 202 and/or "accounting.war" service 222 may include a method that is invoked via a method call from an originator service, and therefore become a target service.

A. Dependency Runtime Mapping Phase

During the dependency runtime mapping phase, monitor 122 records information on calls of methods issued by one or more originator services to one or more target services into table 132. In some examples, monitor 122 monitors the set of methods calls (e.g., method calls 204, 208, 224, and 226) and records one or more of these methods calls into table 132. For one or more method calls, monitor 122 may record a method name, parameters (if any), an originator service, and a target service of the method call into table 132. Table 132 reveals how applications and services use their dependencies. Although monitor 122 is described as recording the method call information into a table, it should be understood that monitor 122 may record the method call information into any data structure that is capable of holding information about method calls.

In some examples, application server 102 is a JAVA application server, and monitor 122 includes Byteman 228. Byteman is a tool that simplifies tracing and testing of JAVA programs. Byteman uses a clear, simple scripting language, based on a formalism called Event Condition Action (ECA) rules to specify where, when, and how the original Java code should be transformed. Dependency security module 120 may be an extension to application server 102 and may use JBOSS Byteman to install aspects inside a JAVA Virtual Machine (JVM) that runs application server 102 and its components. In some examples, monitor 122 receives a set of method calls using Byteman 228, which is used to intercept method calls and allows user 140 to write a rule that specifies that an action X is to be performed if a method named "method1" is called. Byteman 228 may include a package difference module 230 that allows user 140 to extend Byteman 228 to determine the originator service that issued the method call. For example, monitor 122 may receive a method call named "method1" and be able to determine who issued the method call (e.g., method call 204 from "logging.jar" service 202 to "jndi.jar" service 206. As discussed, a service deployed on application server 102 may use any database connection from pool of database connections 130 to connect to another service and issue method calls to that other service. By using Byteman 228 and package difference module 230, dependency security module 120 may be able to limit this possibility by allowing user 140 to specify that a particular originator service is authorized to use only specific database connections for particular target services.

Monitor 122 may receive a high number of method calls, and it may be time consuming to record each of these method calls into table 132. In some examples, monitor 122 may determine whether a method call satisfies a particular condition before recording the method call into table 132. In an example, monitor 122 receives a first method call from a first originator service to a target service, and determines whether the first method call is preceded by a second method call. In response to a determination that the first method call is preceded by the second method call, monitor 122 may record the method name, parameters (if any), originator service, and the target service of the first method call into table 132. In contrast, in response to a determination that the first method call is not preceded by the second method call, monitor 122 may determine to not record information about the first method call.

Package difference module 230 may determine to which service or package an originator service and/or target service belongs. User 140 may define conditions that are applied to a method call that must be satisfied before recording the method call into table 132. In some examples, the condition specifies a chain of method calls (e.g., PackageY.MethodY precedes PackageX.MethodX). In an example, package difference module 230 receives a method call from an originator service to a target service. The method call may specify a method name, and package difference module 230 may determine whether the originator service and target service are the same. In such an example, it may be assumed that a service is always authorized to access its own methods. Accordingly, dependency security module 120 may determine that it is unnecessary to record a method call into table 132 if the originator service and target service of the method call are the same. In response to a determination that the originator service and target service of a method call are the same, monitor 122 may determine to not record information about the method call. In contrast, in response to a determination that the originator service and target service of the method call are not the same, monitor 122 may determine to record information (e.g., method name, parameters (if any), originator service, and target service) about the method call into table 132.

In another example, package difference module 230 receives a call from a first method to a second method and determines whether the first and second methods are within the same module. It may be assumed that a module is always authorized to access its own methods. Accordingly, dependency security module 120 may determine that it is unnecessary to record a first method call into table 132 if the first method is called by a second method and the first and second methods are from the same module. In response to a determination that the first and second methods are within the same module, monitor 122 may determine to not record information about the method call. In contrast, in response to a determination that the first and second methods are not within the same module, monitor 122 may determine to record information (e.g., method name, parameters (in any), originator service, and target service) about the method call into table 132.

In another example, package difference module 230 receives a method call on MethodX from PackageX. Dependency security module 120 may determine whether the method call on MethodX from PackageX is preceded by a method call on MethodY from PackageY. In response to a determination that the method call on MethodX from PackageX is preceded by a method call on MethodY from PackageY, monitor 122 may determine to record information (e.g., method name, parameters (in any), originator service, and target service) about the method call into table 132. In contrast, in response to a determination that the method call on MethodX from PackageX is not preceded by a method call on MethodY from PackageY, monitor 122 may determine to not record information about the method call into table 132.

Monitor 122 records the method call information into table 132 without regard to whether a method call issued by an originator service to a target service is an authorized method call. Accordingly, during the dependency runtime mapping phase, table 132 may store both authorized and unauthorized method calls that have been issued from one or more originator services to one or more target services. Additionally, during the dependency runtime mapping phase, a service deployed on application server 102 may be granted access to one or more databases that the service is not authorized to access as long as the database is connected to application server 102. For example, the service may be provided with a database connection of pool of database connections 130 to access any target service deployed on or coupled to application server 102, even if the service is not authorized to access the target service.

B. Correction Phase

User 140 may terminate the dependency runtime mapping phase and commence the correction phase. User 140 may terminate the dependent runtime mapping phase for various reasons. For example, user 140 may terminate the dependency runtime mapping phase after a time period has elapsed (e.g., 5 days). In another example, user 140 may terminate the dependency runtime mapping phase if she believes that enough method calls have been recorded into table 132. During the correction phase, a user 140 (e.g., an administrator of application server 102) may review the information stored in table 132 and verify whether the information is correct and/or incorrect. For example, user 140 may verify that each of the originator services listed in table 132 is using the correct target services and also issuing method calls with the correct parameters.

Verification module 126 receives user input indicating whether method calls recorded in table 132 are authorized method calls, taking into consideration their originator services, target services, and parameters (if any). In some examples, verification module 126 provides a user interface that accepts input from user 140 to correct information in table 132, remove information from table 132, and/or verify that information in table 132 is correct. User 140 may review table 132 and determine which method calls are authorized, unauthorized, and/or should be modified in order to make them authorized. For example, user 140 may specify specific objects and/or methods that may be invoked by a particular originator service to a particular target service. Verification module 126 modifies, based on the user input, table 132 to exclude each unauthorized method call recorded in table 132. In an example, user 140 provides input indicating which method calls stored in table 132 are unauthorized and/or authorized. Each entry in table 132 may be associated with a method call and specify the method's name, parameters (if any), originator service, and target service of the method call.

In an example, user 140 sends an indication to verification module 126 that a method call that is issued from an originator service to a target service and that has a set of zero or more parameters is not authorized. In this example, verification module 126 may modify, based on the user input, table 132 by removing from table 132 each unauthorized method call that is indicated as being unauthorized. In another example, user 140 sends a request to verification module 126 to modify one or more parameters of a method call recorded in table 132. In this example, verification module 126 may modify, based on the user input, table 132 by modifying the one or more parameters of the method call as requested by user 140. Accordingly, the originator service and target service of the method call may remain the same, but only the parameters changed.

Verification module 126 receives input from user 140 and modifies the entries in table 132 accordingly. At the end of the correction phase, table 132 stores authorized method calls and does not store any unauthorized method calls from an originator service to a target service. In some examples, if a method call from an originator service to a target service specifies a method name and a set of zero or more parameters and the method call is not listed in the updated table 132, then the originator service is not authorized to issue that method call to the target service.

Figure 3:
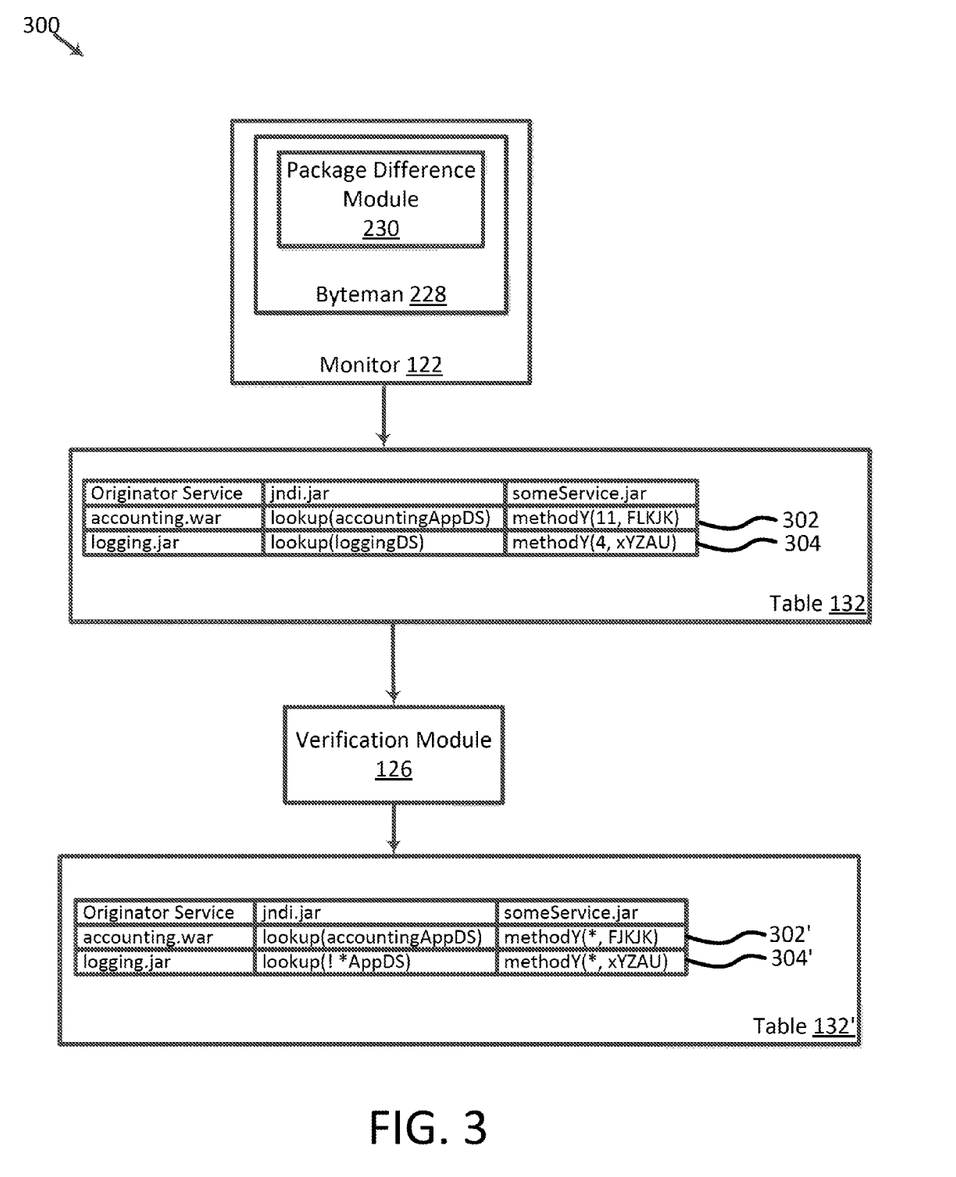
FIG. 3 is a process flow illustrating a modification of table to exclude unauthorized method calls in accordance with one or more embodiments.

FIG. 3 is a process flow 300 illustrating modification of table 132 to exclude unauthorized method calls in accordance with one or more embodiments. In the example illustrated in FIG. 3, monitor 122 may insert entries 302 and 304 into table 132. Entry 302 is based on method calls 224 and 226 issued by "accounting.war" service 222, and entry 304 is based on method calls 204 and 208 issued by "logging.jar" service 202. Table 132 stores security rules based on what dependencies the originator service listed in the first column in table 132 is authorized to use. For example, "accounting.war" service 222 may use the services of "jndi.jar" service 206 (second column of table 132) and in particular uses the "lookup" method provided by "jndi.jar" service 206 with the database connection named "accountingAppDS." Verification module 126 may receive input from user 140 and modify the entries in table 132 to produce table 132'. Table 132' may be the result of removing and/or correcting the entries in table 132 such that all of the entries in table 132' are authorized accesses, as indicated by input from user 140. Table 132' contains the security rules specifying which method calls from originator services to target services are authorized method calls, taking into consideration the originator service, target service, and parameters (if any) of the method calls.

In FIG. 3, table 132' includes entries 302' and 304'. The first column of entry 302 is the originator service, "accounting.war" service 222, that issued the method calls included in the second and third columns of entry 302. The second column of entry 302 includes "lookup(accountingAppDS)," and the second column of entry 302' includes "lookup (accountingAppDS)." The second column of entries 302 and 302' match. Accordingly, user 140 may have provided input indicating that "accounting.war" service 222 is authorized to invoke the "lookup" method with the database connection named "accountingAppDS" at "jndi.jar" service 206, as originally recorded in table 132.

The third column of entry 302 includes "methodY(11, FLKJK)," and the third column of entry 302' includes "methodY(*, FJKJK)." To reduce the amount of data in table 132 or to indicate that a particular value does not matter, user 140 may place a wild card, which is indicated by an asterisk, as an acceptable parameter of a method call. For example, user 140 replaced the integer value "11" in entry 302 with a wild card, as shown in entry 302' in table 132'. Additionally, user 140 modified the parameter value "FLKJK" of the string type in entry 302 in table 132 to become the parameter value "FJKJK" as shown in entry 302' in table 132'. In an example, the second parameter string of the "methodY" method may be a file extension. Accordingly, "accounting.war" service 222 is authorized to invoke the "methodY" method with a first parameter being anything and the second parameter having the string value "FJKJK" at "someService.jar" service 210.

The first column of entry 304 is the originator service, "logging.jar" service 202, that issued the method calls included in the second and third columns of entry 304. The second column of entry 304 includes "lookup(loggingDS)," and the second column of entry 302' includes "lookup(! *loggingDS)." User 140 may have provided input indicating that if "logging.jar" service 202 issues a method call that invokes the "lookup" method provided by "jndi.jar" service 206, the method call should not have a parameter having a database connection name that ends with "AppDS." Accordingly, "logging.jar" service 202 is authorized to invoke the "lookup" method with a parameter having any value that does not end in "AppDS" at "jndi.jar" service 206. In other words, "logging.jar" service 202 is authorized to call the "lookup" method of "jndi.jar" service 206 only with parameters that do not end with "AppDS."

Additionally, the third column of entry 304 includes "methodY(4, xYZAU)," and the third column of entry 304' includes "methodY(*, xYZAU)." User 140 may have modified the first parameter of the "methodY" method in entry 304 to be an asterisk, which is a wild card, as shown in table 132'. Accordingly, "logging.jar" service 202 is authorized to invoke the "methodY" method with a first parameter being anything and the second parameter having the string value "xYZAU" at "someService.jar" service 210.

It is important to note that two different originator services may be authorized to invoke the same method provided by a target service, but with different parameter values. For example, as indicated in entry 302', "accounting.war" service 222 is authorized to invoke the "methodY" method with the first parameter being anything and the second parameter being "FJKJK" at "someService.jar" service 210. In contrast, as indicated in entry 304', "logging.jar" service 202 is authorized to invoke the "methodY" method with the first parameter being anything and the second parameter being "xYZAU" at "someService.jar" service 210. If "accounting.war" service 222 attempts to issue a method call specifying "methodY" as the method name and "xYZAU" (or anything other than "FJKJK") as the second parameter at "someService.jar" service 210, this is an unauthorized method call even though "logging.jar" service 202 is authorized to issue this method call.

C. Access Restriction Phase

User 140 may terminate the correction phase and commence the access restriction phase. During the access restriction phase, dependency security module 120 monitors the method calls issued by originator services deployed on application server 102. Dependency security module 120 receives the method calls issued by each module deployed on application server 102. In some examples, dependency security module 120 intercepts a method call by sniffing on method calls that specify particular methods (e.g., the "lookup" or "methodY" method) and that are issued by particular originator services. Security module 128 ensures that unauthorized method calls are not allowed. Security module 128 restricts, based on data stored in updated table 132', access by an originator service deployed on application server 102 to one or more target services, even if the target service is deployed on or coupled to application server 102.

Figure 4:
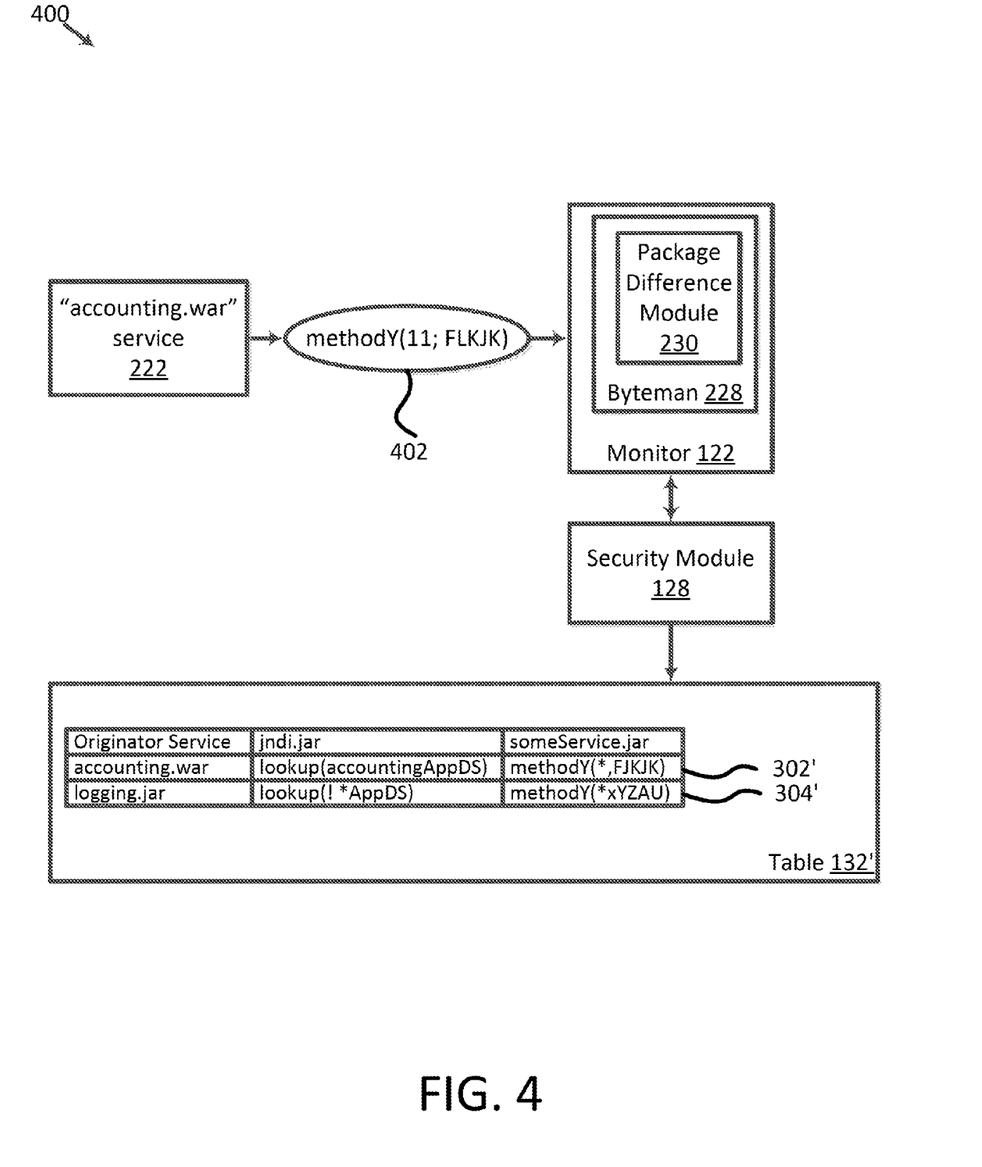
FIG. 4 is a process flow illustrating access by an originator service being controlled by a security module in accordance with one or more embodiments.

FIG. 4 is a process flow 400 illustrating access by an originator service being controlled by security module 128 in accordance with one or more embodiments. In FIG. 4, "accounting.war" service 222 issues a method call 402 to a target service (e.g., "jndi.jar" service 206). Method call 402 has the same originator service, target service, and parameters as method call 226 in FIG. 2. Method call 402 specifies the "methodY" method provided by "someService.jar" service 210 and a parameter value "FLKJK." Security module 128 searches updated table 132' to determine whether "accounting.war" service 222 is authorized to issue method call 402 to "someService.jar" service 210. In an example, security module 128 searches for the method name "methodY" and any parameters specified in the method call to determine whether "accounting.war" service 222 is authorized to issue method call 402 to the target service. If security module 128 does not find method call 402 from the same originator service to the target service and having the same set of parameters, security module 128 may determine that the originator service is not authorized to issue the method call to the target service.

In FIG. 4, method call 402 is not stored in updated table 132'. Even though "accounting.war" service 222 is authorized to invoke the "methodY" at "someService.jar" service 210, the parameters of method call 402 and those listed in entry 302' for the "methodY" method are different. Accordingly, security module 128 may determine that "accounting.war" service 222 is not authorized to issue method call 402 to the target service (e.g., "someService.jar" service 210). In response to a determination that "accounting.war" service 222 is not authorized to issue method call 402 to the target service, security module 128 may block "accounting.war" service 222 from issuing method call 402 to the target service. In some examples, security module 128 blocks "accounting.war" service 222 from issuing method call 402 to the target service by denying "accounting.war" service 222 a database connection from pool of database connections 130 to access the target service. The target service may be a database. In some examples, security module 128 blocks "accounting.war" service 222 by throwing an exception. In some examples, in response to the determination that "accounting.war" service 222 is not authorized to issue method call 402 to the target service, security module 128 sends to "accounting.war" service 222 an error message indicating that method call 402 is unauthorized.

In contrast, in response to a determination that "accounting.war" service 222 is authorized to issue method call 402 to the target service, security module 128 may pass method call 402 to the target service. In some examples, in response to the determination that "accounting.war" service 222 is authorized to issue method call 402 to the target service, security module 128 provides a database connection from pool of database connections 130 to "accounting.war" service 222 to use to invoke the method "methodY" provided by the target service.

As discussed above and further emphasized here, FIGS. 1-4 are merely examples, which should not unduly limit the scope of the claims. For example, it should be understood that one or more components (e.g., monitor 122, verification module 126, and security module 128) may be combined with another component. In an example, verification module 126 and security module 128 are combined into one component. It should also be understood that a component may be separated into more than one component.

Although application server 102 is illustrated as being coupled to one database in FIG. 1, it should be understood that application server 102 may be coupled to one or more databases. Additionally, dependency security module 120 may store information about method calls into one or more data structure.

III. Example Method

Figure 5:
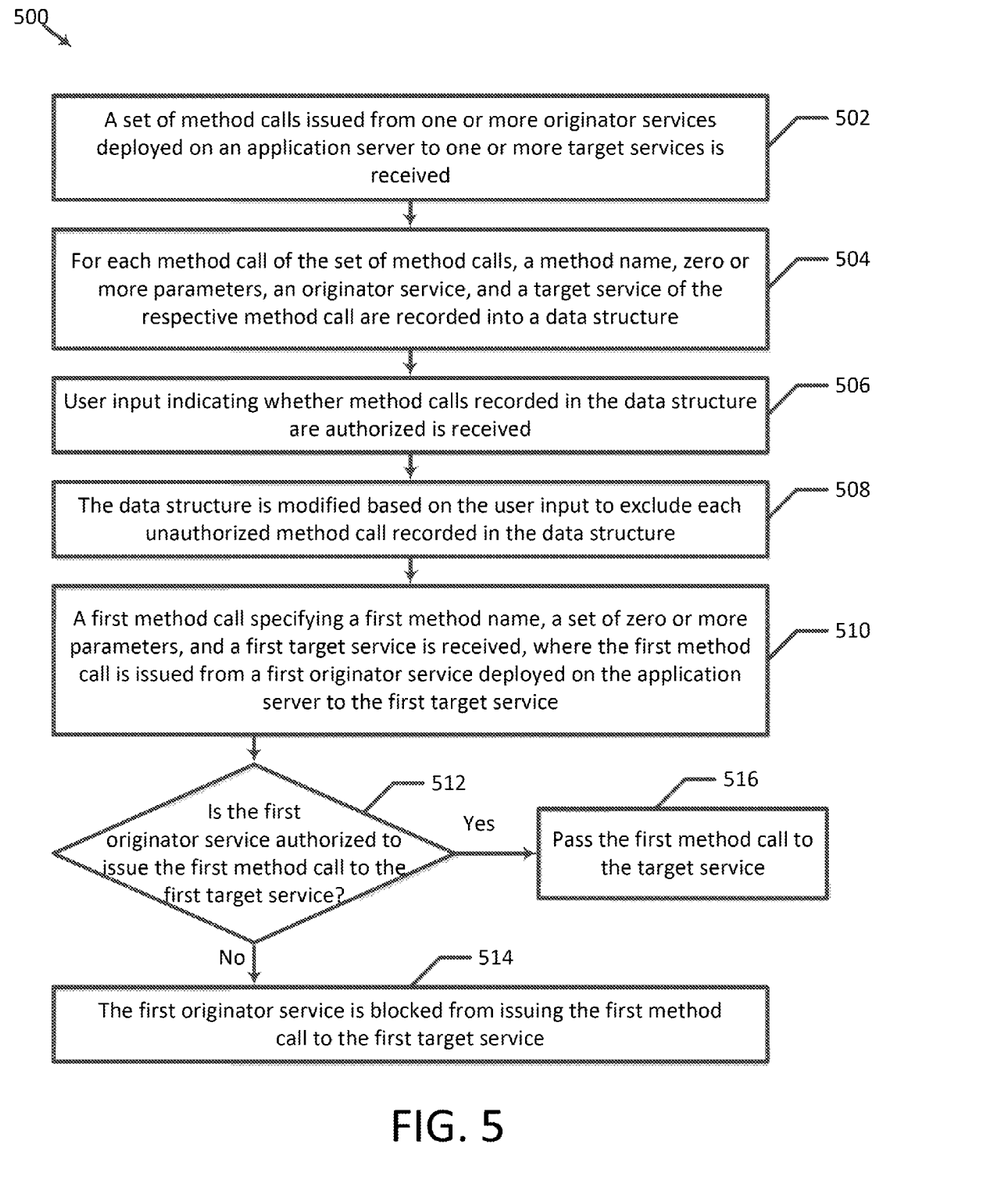
FIG. 5 is a flowchart illustrating a method of controlling access by one or more services deployed on an application server in accordance with one or more embodiments.

FIG. 5 is a flowchart illustrating a method 500 of controlling access by one or more services deployed on an application server in accordance with one or more embodiments. Method 500 is not meant to be limiting and may be used in other applications.

Method 500 includes blocks 502-516. In a block 502, a set of method calls issued from one or more originator services deployed on an application server to one or more target services is received. In an example, monitor 122 receives method calls 204, 208, 224, and 226 issued from "logging.jar" service 202 and "accounting.war" service 222, which are originator services deployed on application server 102, to one or more target services. Monitor 122 may use Byteman 228 to intercept the method calls and package difference module 230 to determine the originator service of each of the method calls.

In a block 504, for each method call of the set of method calls, a method name, zero or more parameters, an originator service, and a target service of the respective method call are recorded into a data structure. In an example, for one or more method calls of method calls 204, 208, 224, and 226, monitor 122 records a method name, parameters (if any), an originator service, and a target service of the respective method call into table 132. In a block 506, user input indicating whether method calls recorded in the data structure are authorized is received. In an example, verification module 126 receives user input indicating whether method calls recorded in table 132 are authorized.

In a block 508, the data structure is modified based on the user input to exclude each unauthorized method call recorded in the data structure. In an example, verification module 126 modifies table 132 based on the user input to exclude each unauthorized method call recorded in the table. The updated table may be table 132', which does not include any unauthorized method calls from an originator service to a target service.

In a block 510, a first method call specifying a first method name, a set of zero or more parameters, and a first target service is received, where the first method call is issued from a first originator service deployed on the application server to the first target service. In an example, monitor 122 receives method call 402 specifying a first method name, a set of zero or more parameters, and a first target service of the method call, where method call 402 is issued from "accounting.war" service 222 to "someService.jar" service 210.

In a block 512, it is determined whether the first originator service is authorized to issue the first method call to the first target service. In an example, security module 128 determines whether "accounting.war" service 222 is authorized to issue method call 402 to "someService.jar" service 210. Security module 128 may search table 132' for a method call having the same originator service, target service, and parameters (if any) as method call 402. If security module 128 does not find such information in table 132', security module 128 may determine that "accounting.war" service 222 is not authorized to issue method call 402 to "someService.jar" service 210. If, however, security module 128 finds such information in table 132', security module 128 may determine that "accounting.war" service 222 is authorized to issue method call 402 to "someService.jar" service 210.

If the first originator service is not authorized to issue the first method call to the first target service, process flow proceeds from block 512 to a block 514, in which the first originator service is blocked from issuing the first method call to the first target service. In an example, if security module 128 determines that "accounting.war" service 222 is not authorized to issue method call 402 to "someService.jar" service 210, security module 128 may block "accounting.war" service 222 from issuing method call 402 to "someService.jar" service 210.

In contrast, if the first originator service is authorized to issue the first method call to the first target service, process flow proceeds from block 512 to a block 516, in which the first method call is passed to the first target service. In an example, if security module 128 determines that "accounting.war" service 222 is authorized to issue method call 402 to "someService.jar" service 210, security module 128 may pass method call 402 to "someService.jar" service 210 for processing.

In some embodiments, one or more actions illustrated in blocks 502-516 may be performed for any number of times user 140 wishes to reset the security rules in table 132. It is understood that additional processes may be inserted before, during, or after blocks 502-516 discussed above. It is also understood that one or more of the blocks of method 500 described herein may be omitted, combined, or performed in a different sequence as desired.

IV. Example Computing System

Figure 6:
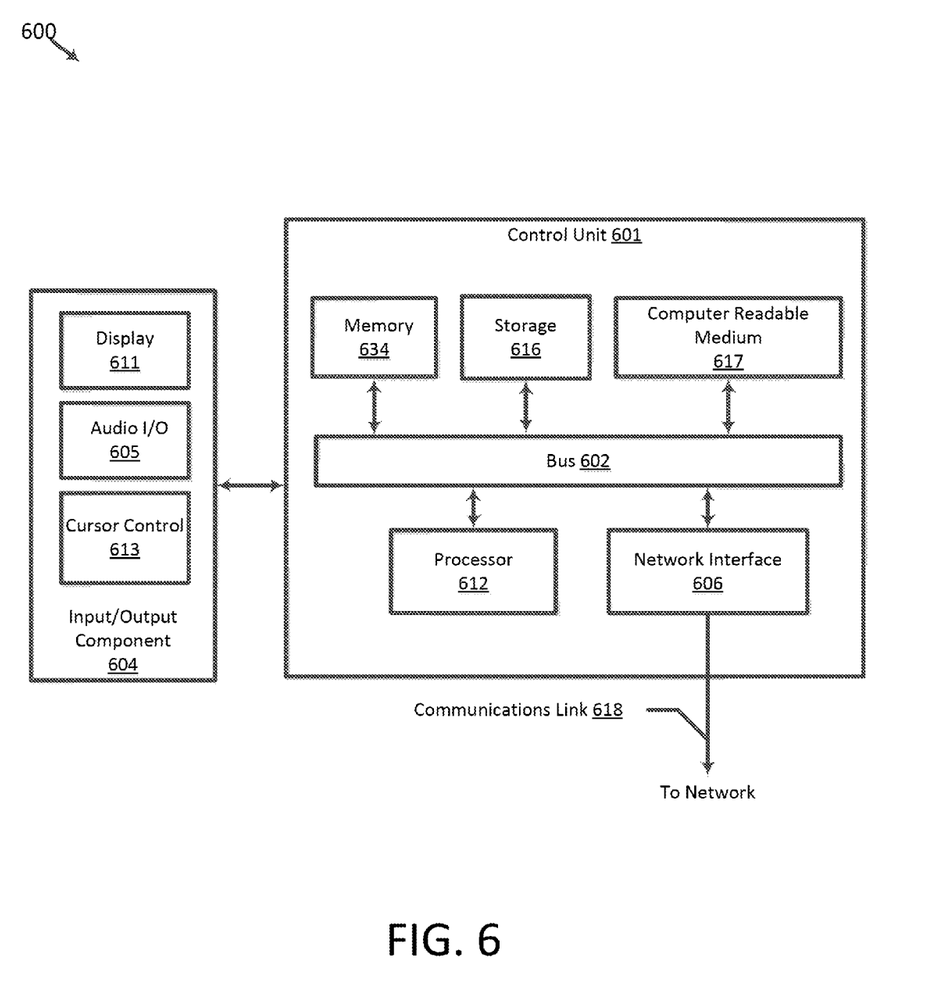
FIG. 6 is a block diagram of an electronic system suitable for implementing one or more embodiments of the present disclosure.

FIG. 6 is a block diagram of a computer system 600 suitable for implementing one or more embodiments of the present disclosure. Each of the services deployed on application server 102, monitor 122, verification module 126, security module 128, and application server 102 may execute on a computing device. The computing device may include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the application server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. A processor 612, which may be a micro-controller, digital signal processor (DSP), or other processing component, processes these various signals, such as for display on computer system 600 or transmission to other devices via communications link 618. Components of computer system 600 also include a system memory component 634 (e.g., RAM), a static storage component 616 (e.g., ROM), and/or a computer readable medium 617. Computer system 600 performs specific operations by processor 612 and other components by executing one or more sequences of instructions contained in system memory component 634.

Components include an input/output (I/O) component 604 that processes a user action, such as selecting keys from a keypad/keyboard, selecting one or more buttons or links, etc., and sends a corresponding signal to bus 602. I/O component 404 may include an output component such as a display 611, and an input control such as a cursor control 613 (such as a keyboard, keypad, mouse, etc.). An optional audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via communications link 618 to a network. In an embodiment, the transmission is wireless, although other transmission mediums and methods may also be suitable.

Logic may be encoded in computer readable medium 617, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an embodiment, the logic is encoded in non-transitory computer readable medium. Transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM PROM, EEPROM, FLASH-EEPROM, any other memory chip or cartridge, or any other medium from which a computer is adapted to read. In various embodiments of the present disclosure, execution of instruction sequences (e.g., method 500) to practice the present disclosure may be performed by computer system 600. In various other embodiments of the present disclosure, a plurality of computer systems 600 coupled by communications link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of controlling access to one or more services coupled to an application server, comprising:
   receiving a set of method calls issued from one or more originator services deployed on an application server to one or more target services;
   for each method call of the set of method calls, recording a method name, zero or more parameters, an originator service, and a target service of the respective method call into a data structure;
   receiving user input indicating whether method calls recorded in the data structure are authorized;
   modifying, based on the user input, the data structure to exclude each unauthorized method call recorded in the data structure;
   receiving a first method call specifying a first method name, a set of zero or more parameters, and a first target service, wherein the first method call is issued from a first originator service deployed on the application server to the first target service;
   after modifying the data structure, searching the data structure to determine whether the first originator service is authorized to issue the first method call to the first target service; and
   in response to a determination that the first originator service is not authorized to issue the first method call to the first target service, blocking the first originator service from issuing the first method call to the first target service.

2. The method of claim 1, further comprising:
   in response to a determination that the first originator service is authorized to issue the first method call to the first target service, passing the first method call to the target service.

3. The method of claim 1, wherein the first target service includes a method having the first method name.

4. The method of claim 3, wherein the application server maintains a pool of database connections for accessing the one or more target services coupled to the application server, the method further comprising:
   in response to the determination that the first originator service is authorized to issue the first method call to the first target service, providing a database connection of the pool to the first originator service to use to invoke the method provided by the target service.

5. The method of claim 1, wherein the application server maintains a pool of database connections for accessing the one or more target services coupled to the application server, and wherein blocking the first originator service from issuing the first method call to the first target service includes denying the first originator service a database connection of the pool to access the target service.

6. The method of claim 1, wherein receiving the set of method calls includes using Byteman to receive the set of method calls.

7. The method of claim 1, further comprising:
   receiving a second method call from a second originator service deployed on the application server to a second target service; and
   determining whether the first method call is preceded by the second method call, wherein the recording includes in response to a determination that the first method call is preceded by the second method call, recording the first method name, the set of zero or more parameters, the first originator service, and the first target service of the first method call into the data structure.

8. The method of claim 1, wherein modifying the data structure includes removing from the data structure each unauthorized method call that is indicated as being unauthorized.

9. The method of claim 1, wherein receiving the user input includes receiving a request to modify one or more parameters of the first method call recorded in the data structure, and wherein modifying the data structure includes modifying, based on the request, the one or more parameters of the first method call.

10. The method of claim 1, wherein blocking the first originator service includes throwing an exception.

11. The method of claim 1, further comprising:
    in response to the determination that the first originator service is not authorized to issue the first method call to the first target service, sending to the first originator service an error message indicating that the first method call is unauthorized.

12. A system for controlling access to one or more services coupled to an application server, comprising:
    a memory storing a data structure that stores information on calls of methods issued by one or more originator services deployed on an application server to one or more target services coupled to the application server;
    a monitor that receives a set of method calls from the one or more originator services, and that records a method name, zero or more parameters, an originator service, and a target service of each method call of the set of method calls into the data structure;
    a verification module that receives user input indicating whether method calls recorded in the data structure are authorized and that modifies, based on the user input, the data structure to exclude each unauthorized method call recorded in the data structure; and
    a security module that receives a first method call after the verification module has modified the data structure and searches the data structure to determine whether an originator service of the first method call is authorized to issue the first method call to a first target service of the first method call, and wherein in response to a determination that the first originator service is not authorized to issue the first method call to the first target service, the security module blocks the first originator service from issuing the first method call to the first target service.

13. The system of claim 12, wherein the monitor, verification module, and security module are deployed on the application server.

14. The system of claim 12, wherein the application server executes on the JAVA platform.

15. The system of claim 12, wherein the monitor monitors a plurality of method calls from one or more originator services deployed on the application server to one or more target services.

16. The system of claim 12, wherein before the data structure is modified, the first originator service has access to the first target service.

17. The system of claim 12, wherein the first target service is a database coupled to the application server.

18. The system of claim 12, wherein the first target service includes a method having the first method name, wherein the application server maintains a pool of database connections for accessing one or more target services coupled to the application server, and wherein in response to a determination that the first originator service is authorized to issue the first method call to the first target service, the security module provides a database connection of the pool to the first originator service to invoke the method provided by the target service.

19. The system of claim 12, wherein the application server maintains a pool of database connections for accessing one or more target services coupled to the application server, and wherein the security module blocks the first originator service from issuing the first method call to the first target service by denying the first originator service a database connection of the pool to access the target service.

20. A non-transitory machine-readable medium comprising a plurality of machine-readable instructions that when executed by one or more processors are adapted to cause the one or more processors to perform a method comprising:

receiving a set of method calls issued from one or more originator services deployed on an application server to one or more target services;

for each method call of the set of method calls, recording a method name, zero or more parameters, an originator service, and a target service of the respective method call into a data structure;

receiving user input indicating whether method calls recorded in the data structure are authorized;

modifying, based on the user input, the data structure to exclude each unauthorized method call recorded in the data structure;

receiving a first method call specifying a first method name, a set of zero or more parameters, and a first target service, wherein the first method call is issued from a first originator service deployed on the application server to the first target service;

after modifying the data structure, searching the data structure to determine whether the first originator service is authorized to issue the first method call to the first target service; and     in response to a determination that the first originator service is not authorized to issue the first method call to the first target service, blocking the first originator service from issuing the first method call to the first target service.

\* \* \* \* \*